US010484372B1

(12) United States Patent
Johansson et al.

(10) Patent No.: US 10,484,372 B1
(45) Date of Patent: Nov. 19, 2019

(54) AUTOMATIC REPLACEMENT OF PASSWORDS WITH SECURE CLAIMS

(71) Applicant: Amazon Technologies, Inc., Seattle, WA (US)

(72) Inventors: Jesper Mikael Johansson, Redmond, WA (US); Rami Kawach, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 14/968,422

(22) Filed: Dec. 14, 2015

(51) Int. Cl.
H04L 9/32 (2006.01)
H04L 29/06 (2006.01)

(52) U.S. Cl.
CPC ...... H04L 63/0861 (2013.01); H04L 63/0442 (2013.01); H04L 63/083 (2013.01); H04L 63/0892 (2013.01)

(58) Field of Classification Search
CPC ............. H04L 63/0861; H04L 63/0442; H04L 63/083; H04L 63/0892
See application file for complete search history.

(56) References Cited

U.S. PATENT DOCUMENTS

| 6,978,025 | B1* | 12/2005 | Price, III | H04L 63/06 380/277 |
| 8,245,037 | B1 | 8/2012 | Durgin et al. | |
| 8,312,523 | B2* | 11/2012 | Geller | G06F 21/31 726/8 |
| 8,627,438 | B1 | 1/2014 | Bhimanaik | |
| 9,654,469 | B1* | 5/2017 | Yang | H04L 63/0861 |
| 2007/0106895 | A1* | 5/2007 | Huang | H04L 9/0866 713/170 |
| 2007/0118891 | A1* | 5/2007 | Buer | G06F 21/34 726/8 |
| 2010/0191967 | A1* | 7/2010 | Fujii | G06F 21/32 713/169 |
| 2013/0219166 | A1* | 8/2013 | Ristov | H04L 63/0823 713/151 |
| 2014/0095870 | A1* | 4/2014 | Dewan | H04L 9/0866 713/167 |
| 2015/0139512 | A1 | 5/2015 | Han et al. | |
| 2015/0146945 | A1 | 5/2015 | Han et al. | |
| 2015/0195278 | A1* | 7/2015 | Plotkin | H04L 63/0861 713/186 |

(Continued)

Primary Examiner — Mahfuzur Rahman
Assistant Examiner — Darshan I Dhruv
(74) Attorney, Agent, or Firm — Davis Wright Tremaine LLP

(57) ABSTRACT

Secure interactions between a client device executing an application and a remote server associated with the application are enabled without credentials such as passwords. The application may acquire an encryption key pair, store a first key of the pair on the client device, and secure access to it by associated biometric data. The second key of the pair is stored on the remote server in association with the user's account. Responsive to a request on the application for an action that requires authentication with the remote server, the user must input biometric data which, only if verified, enables access to use the first key. The first key is then used to encrypt authentication data for submission to the remote server. The server accesses the public key and uses it to decrypt the data and verify the source of the request. If verified, the server then authorizes the requested action.

20 Claims, 8 Drawing Sheets

(56) References Cited

U.S. PATENT DOCUMENTS

| | | | |
|---|---|---|---|
| 2015/0200935 A1* | 7/2015 | Ikeda | H04L 63/0861 726/7 |
| 2016/0381006 A1* | 12/2016 | Rykowski | H04L 63/0823 713/156 |
| 2017/0208464 A1* | 7/2017 | Guertler | G06Q 20/02 |

* cited by examiner

AUTHENTICATION
COMMUNICATIONS

AUTOMATIC REPLACEMENT OF PASSWORDS WITH SECURE CLAIMS

BACKGROUND

Online customers utilize a variety of devices for online shopping and other activities, including mobile devices such as smartphones. Some mobile devices incorporate biometric sensors for identifying a user of the device, one example being a fingerprint sensor, a capacitive sensor which is typically utilized by the user placing her thumb or fingerprint over the sensor. Biometric sensors may be used to "unlock" a device and, more generally, to identify or authenticate a user.

Some mobile shopping applications ("Mshop apps") support authenticating customers using the fingerprint sensor technology built into phones. Hereinafter, a customer is referred to as a user. A user may opt to enable using the fingerprint sensor with the Mshop application. If so, on request of the Mshop, an operating system ("OS") may store the user's password and secure access to it utilizing the fingerprint sensor data. Subsequently, fingerprint sensor can be used to fetch the user's password when the user makes a request in the Mshop application, such as a purchase or credit card update that requires authentication. There is a need, however, for more secure procedures to better protect user passwords and enhance online security without unduly complicating or impeding online transactions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
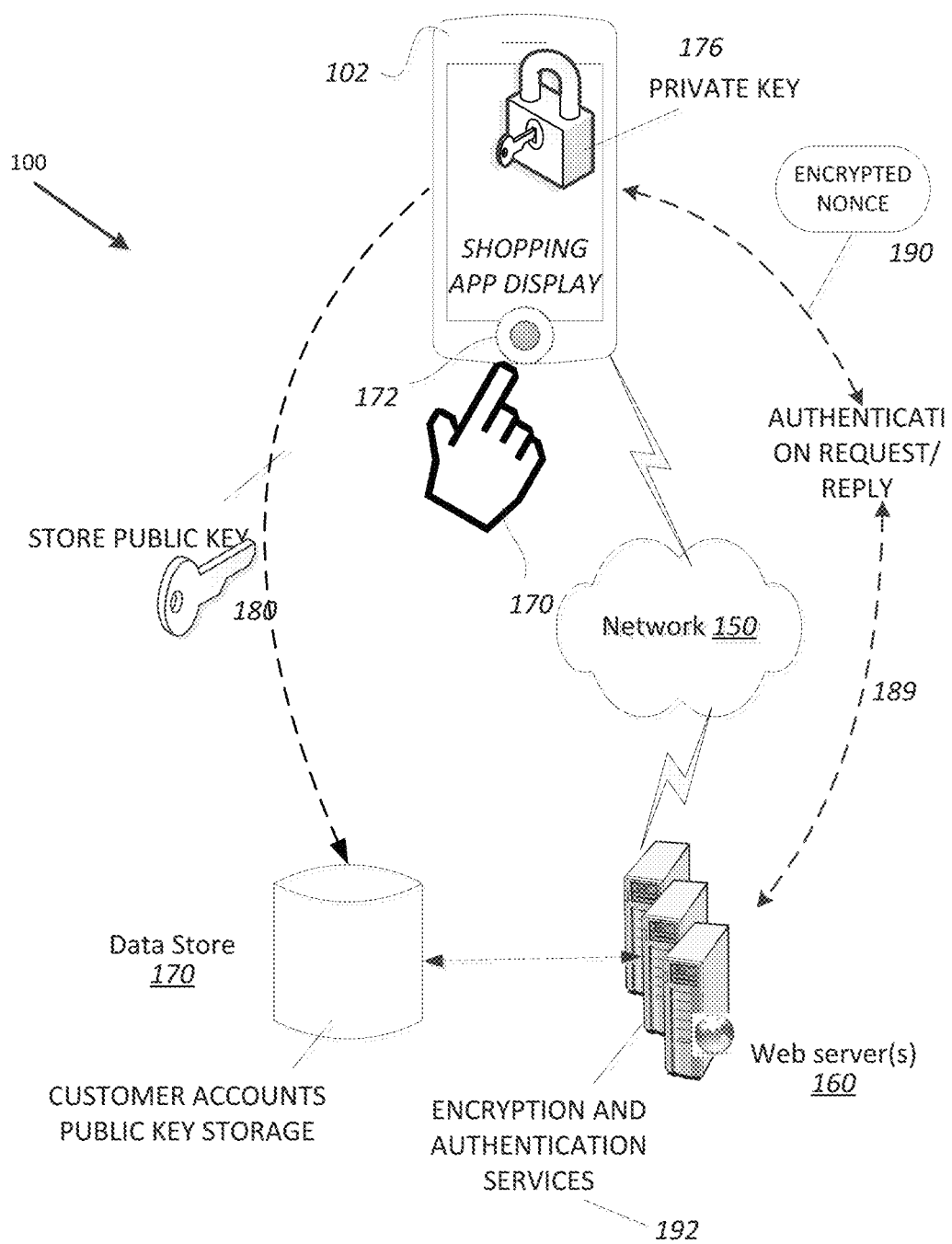
FIG. 1 is a simplified system diagram illustrating an example of an environment in which some embodiments of the principles described herein may be used.

A person using a device, such as a computer, laptop, tablet, smartphone, etc. to interact with a web site may be given an option to utilize a biometric sensor, or any other "user personal authentication data," to authenticate the user on the device. Classes of user personal authentication data or sources include but are not limited to biometric data, private user knowledge data, or possession of something, such as a physical object. The use of biometric data is described in more detail below by way of illustration and not limitation. Thus various sensors or input devices on the device (or coupled to it) may be used to authenticate the user. For example, in some embodiments, where a user is running an application program to interact with a particular website, the application may ask the user whether to use a biometric sensor for authentication to that server going forward, rather than send a password or other security credential to the server. Examples of security credentials may include usernames, passwords, biometric identifiers, secure certificates, private keys, answers to knowledge-based questions, device identifiers, and so on. If the user chooses this option, the application generates (or obtains) an asymmetric encryption key pair, also called a public/private key-pair, which may be done in the background. That is, it need not be apparent to the user that the application is acquiring an encryption key pair. The application submits one of the key pairs (e.g., the public key) to the vendor server system, where it is stored in association with the user's account, or the user's device, or both.

The application submits the other one of the key pairs (e.g., the private key) for secure storage on the device. For example, the private key may be submitted to the operating system (OS) for the OS to store the key in a secure sub-system or private area of memory on the device. The private key should be secured by personal authentication data, such as biometric data. In other words, matching data will be required to access the private key, as described later. The private key remains on the user device. Upon completion of this setup phase, the user/device are now provisioned to utilize the device's biometric or other sensor system for authentication to carry out actions on the vendor's server system that require authentication.

When using the device to interact with a vendor's server system (e.g., to interact with a website using a browser or mobile application, or to interact with APIs using a mobile application, etc.), the user may request an operation or perform a task that requires authentication. In response, the application requests the private key from the OS. The private key is secured, however, and before releasing it, the OS requests the user to utilize the biosensor (e.g., the OS causes a prompt to be displayed on a display device), for example, or provide other personal authentication data. The sensor acquires biometric input data, which may be processed in a biometric processing application. The OS checks the biometric input data for a match by comparison to previously acquired and stored information, and if a match is found, the OS retrieves the private key from secure storage and delivers it to the application. It should be noted that the biometric "match" need not be perfect; it may allow for an acceptable level of confidence. In some embodiments the OS does not release the private key; rather, it may provide encryption for the application utilizing the private key once the user's identity is verified.

In some embodiments, the application receives the private key and uses it to digitally encrypt an authentication data object, for example, a cryptographic nonce. One example of a nonce is a time stamp. Other examples may include a random or pseudo-random number. The data object is not limited to a nonce; rather it may comprise any data specified in an authentication protocol agreed to in advance by the application and the server system. The application then sends the encrypted data object to the server system, for example in an HTTPS request. At the server system, software receives the request, identifies the user, device and/or account from the request, looks up the user's public key, and uses the public key to decrypt the data object. The nonce or other data object may then be verified, for example, by comparison to a system time, GPS location, or any other parameter or data as defined by the applicable protocol. If the decryption succeeds, and the data object is verified, the server returns a reply indicating that the user is authenticated to conduct restricted actions, without submitting a password or other user credential to the server. The application may then permit the user to continue with otherwise restricted actions. The data object may be created to be cryptographically verifiable by the system to which the object is to be provided or another system that operates in conjunction with the system to which the object is to be provided. For example, the object may be encrypted so as to be decryptable by the system that will cryptographically verify the object, where the ability to decrypt the object serves as cryptographic verification of the object.

In other examples, both encryption and digital signatures may be used for cryptographic verifiability (and security). The key used to encrypt and/or digitally sign the object may vary in accordance with various embodiments and the same key is not necessarily used for both encryption and digital signing, where applicable. In some embodiments, a key used to encrypt the data object is a private key of a public/private key pair, where the public key of the key pair is maintained on the server side, thereby enabling the server system to decrypt the data object using the public key of the key pair. In another embodiment, a key used to encrypt the object is a public key of a public/private key pair, where the private key of the key pair is maintained on the server side, thereby enabling the system to decrypt the object using the private key of the key pair. The key pair in general enables secure communications between the device and the server side, obviating the need to maintain, store or transmit the user's password.

Using the public key to encrypt the object may include generating a symmetric key, using the symmetric key to encrypt the object, and encrypting the symmetric key using the public key, where the encrypted symmetric key is provided to a system with the encrypted object to enable the system to use the corresponding private key to decrypt the symmetric key and use the decrypted symmetric key to decrypt the object. Further, in some embodiments, the object is digitally signed using a private key of a public/private key pair corresponding to the computer system that encrypts and/or digitally signs the object. For example, an application may be provisioned with the private key and the data object may include a certificate for the private key for use by a system for verification of the digital signature of the object. In other variations, a symmetric key may be shared between the user computer and the server system that cryptographically verifies the object.

Referring now to FIG. 1, a simplified diagram of a system 100 illustrates some aspects of the present disclosure. A mobile computing device, illustrated as a smartphone 102, may also be any stationary or portable computing device. The term "device" is used herein in a broad sense to refer to generally any device having a processor capable of executing instructions or "code" and having some means for communication over a network. For example, a mobile device may have suitable adapters, further described later, for connection to Wi-Fi, a LAN, a WAN, the Internet or any other wired, wireless, or hybrid network suitable for communication of data between the device and a second computing device. For illustration here, and not by way of limitation, the mobile device 102 is shown as capable of communication over a wireless network 150 which in turn may connect to the Internet or another network (not shown). Directly or indirectly, a server 160 is shown as also adapted for communication via the network 150. The server 160 is merely illustrative and represents a server system that may comprise any number of servers, described in more detail later with reference to FIG. 7. In some embodiments, the mobile device 102 may be configured with a radio for wireless communication of voice and data over a telecommunications network, which in turn may be connected to the Internet. A representative mobile device is described in more detail later with reference to FIG. 6. A server 160 may comprise a web server, arranged to host a web site, details of which are known. For example, the web server may host a shopping or e-commerce site that enable a user to browse product catalogs and make purchases from a user device such as the mobile device 102. In the case of a web site, the user device will generally have a program, such as a web browser, executable on the device for displaying and interacting with network files, such as web pages, downloaded to the browser from the server 160. The term "server" is used herein in a broad sense, as further described below with reference to FIG. 7.

Again referring to FIG. 1, the mobile device 102 may have a biometric sensor 172 coupled to or built into the device. Various biometric sensors are known, and any sensor may be used in connection with embodiments in accordance with this disclosure. A few examples include a capacitive, inductive, or resistive or other type of touch sensor, a retinal scanner, IR imaging sensor, optical sensor arranged for facial recognition, microphone for voice recognition, etc. Biometric or other sensors may be used to limit access to use or "login" to a device by requiring that a new biometric input match biometric data previously stored on the device, with a reasonable tolerance or probability or a match. The mobile device 102 may have a secure element or memory space where biometric data is stored so that it is accessible to an operating system running on the device but not accessible to application programs, as further explained later.

In connection with some operations described in more detail below, an application program executable on the mobile device 102 may acquire a cryptographic key pair, for example, an asymmetric key pair, to secure certain types of transactions. Various ways to acquire or generate such key pairs, locally or from a remote server, are known. The key pair may be acquired by an operating system ("OS") executing on the device 102, or by an application program (not shown) running on the device. In some embodiments, an application program may be a "shopping application" adapted for interaction with an Internet e-commerce website. For example, various shopping apps are available for download on the Internet. Many retailers, both traditional ("brick and mortar") as well as on-line retailers have their own private-label or proprietary shopping apps. On-line shopping at most websites can be conducted without a special application, using a general-purpose web browser. However, especially for devices with smaller screen sizes, a dedicated "mobile application" designed for such devices may be easier to use.

In FIG. 1, a shopping application executing on the device 102 may be configured to acquire the cryptographic key pair. In the example of an asymmetric key pair, one key of the pair may be stored locally on the device. For example, a private key 176 is illustrated as stored on the device. In one embodiment, the private key is stored securely as further described later. The other key of the pair, say a public key 180, may be submitted from the device 102 to the remote server 160 for storage in a datastore 170 in communication with the server 160.

In the operations described in more detail below with reference to the other drawings, in some embodiments, two steps emerge: (1) a setup or provisioning phase and (2) a use phase. In the setup or provisioning stage, described in more detail below with reference to FIG. 2, the application is configured to use biometric or other user personal authentication data, an encryption key pair is acquired, a first key is stored on the device, and the other key of the pair is submitted for storage on a server 160 or related datastore 170, such as a website server, using a pre-shared secret such as a password as an authenticator. In one embodiment, the first key is stored on the device in a secure element, and it is secured by the OS based on user personal authentication data, so that a biometric match or other data match is required to access it. For example, a pre-shared secret such as a password may be used to authenticate the user initially. By storing and using this key on the device 102, as detailed below, subsequent secure transactions can proceed without using a password or other credential to access the remote server. The first key remains secure—it is not exposed to any user, or transmitted outside the device, or accessible to any application other than the shopping application under discussion. In some embodiments, the first key is only available to, and utilized by, the OS. The user is authenticated by the server, for example, using a password. After authentication, or in connection with the same request, the second key is sent to the server for storage. Authentication may have occurred earlier, for example, in establishing an HTTPS session. Successful transmission of the second key 180 of the pair to the server side completes the setup phase. The device 102 is now provisioned for secure interactions with a website (hosted by server 160) without requiring a password to be sent to the server or even stored on the device.

The use phase occurs while a user is interacting with a website, such as during a communications session. This phase is further described below with reference to FIG. 3. A user of the mobile device may request an action or a service on the server that is restricted for various reasons, for example, where there is a risk of fraud, identity theft, or any actions that may have been determined by an operator of the website should be carefully limited to known customers. These are referred to herein as "restricted actions" or "restricted services." When a user input requests a restricted action or service, during use of an application program to interact with the remote server 160, responsive to the restricted action request, the application may submit a request to the operating system to obtain the private key 176. The OS may provide the private key, subject to a user physical or biometric input, such as using her hand 170, touching the biometric sensor 172, and the resulting biometric data matching previously stored data. Hereinafter, we describe use of biometric data as illustrative and to simplify the discussion, but other types of user personal authentication data, including private user knowledge data, and/or possession of something, such as a secure personal device (e.g., a smart card, chip card, integrated circuit card and token), may be used as well to secure the encryption key stored on the device. In some embodiments, private user knowledge data may include any data known to or readily ascertainable by the user, but not generally known to others. Possession of a physical object may be used, for example, an RSA SecureID® OTP device, Gemalto® or other token mechanism (e.g., a hardware token, such as a USB dongle, or a software token that is assigned to the user and generates an authentication code at fixed intervals using a built-in clock and a factory-encoded random key or seed).

In this example, the application may receive a reply from the remote server 160 defining a nonce or other data required for authentication, in other words a set of data, indicated at dashed line 189. The data requested by the server may include private user knowledge data. In this case, the application may prompt the user to input such data, such as their last purchase (item or price), date when they last used some service on the server, data the server looked up with an external data source that only the user knows, etc. The application assembles the required data, and encrypts the data using the private key 176. The encrypted data 190 is sent to the server 160. In some embodiments, information may also be sent along with or in a separate communication to enable the server to look up the "public" key. In most cases, a secure session is already established that enables the server to identify the source of the message and thus look up the corresponding key.

At the server, encryption services 192 access the previously stored key 180 from the datastore 170 and utilize the previously stored key 180 to decrypt and validate the nonce data. In other embodiments, the reply message 189 may be unnecessary. Rather, an authentication protocol may be agreed upon in advance that specifies the format and content of a data object required to authenticate the user to the server. If the validation succeeds, the server permits the restricted action or service to proceed. The server may send an indication to that effect back to the application on the mobile device. In this way, security is ensured, without the user having to send her password to the server during the use phase. Indeed, the user need not even store a password on the device. Accordingly, no password or other credential is at risk of being lost or compromised. Nonetheless, secure transactions can be carried out between the device and the server, for example, purchase transactions, changes to user profile data, updates to payment arrangements, shipping addresses, etc.

This authentication process has several advantages stemming from the fact that the application no longer needs to store or handle the customer's password or other credential. If the device is compromised and the secrets are revealed to an unauthorized third-party, it is a device-specific secret (e.g., the private key 176) that is leaked, not the customer's password. Canceling or revoking the authentication process provisioned as described in FIG. 2 can be done without changing the customer's password. Furthermore, a server operator could more easily detect which devices are used to authenticate the customer. This helps to defend against fraud as a server operator, in some embodiments, can identify the devices based on the device IDs that are submitted. Further, the server or associated authentication end-point may be configured to only permit authentication through the device secret. This allows an entity associated with server 160 to better manage the risk scoring and may obviate the need for additional authentication claims, such as CAPTCHA or multi-factor authentication, that may require additional steps by the user and more processing on the device, the server and any intermediate devices such as proxy servers. Additionally, after provisioning as described with reference to FIG. 2, the server now has a cryptographic secret that can be used to protect other data in the application that a user (or server operator) may want to keep secret and thus provide stronger protection for the application than may have previously been done.

Figure 2:
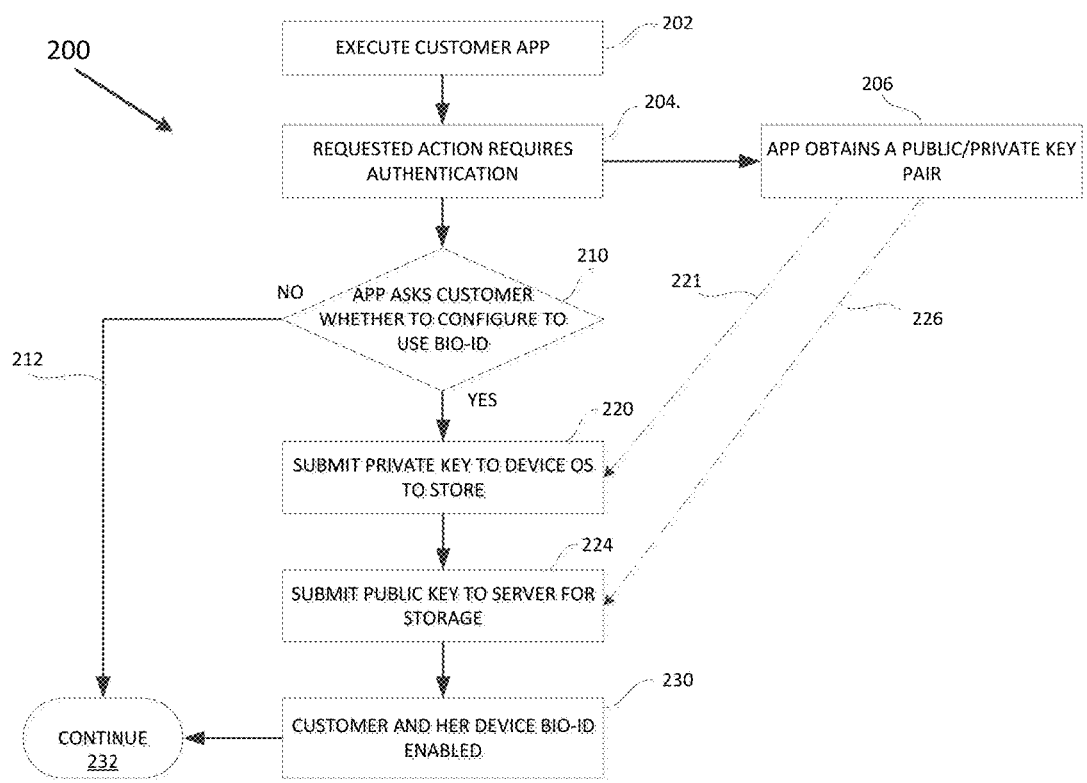
FIG. 2 is a simplified flow diagram illustrating an example process to configure secure authentication of a device user, in accordance with various embodiments of the principles described herein.

FIG. 2 is a simplified flow diagram illustrating an example setup process 200 to provision secure authentication of a user and/or a device to a server, in accordance with various embodiments of the principles described herein. This is one example of a setup phase mentioned with respect to FIG. 1. The process or method 200 begins with a device executing a customer application, block 202. An input to the application program (e.g., by use of a user input device) may request an action that requires authentication by a remote server, block 204. The input requesting such an action may be a user action, a request by the user, or another type of "action" for example, a programmatically generated action or request from a server, device, or other application on the device, or from an external device, program or signal, that may request authentication without user input. The requested action may be a "restricted action" or service as described with respect to FIG. 1. Responsive to the action 204, the application may obtain "shared secret" information, block 206. In one embodiment, the shared secret may be an asymmetric key pair. The key pair may be provided by the OS, generated by the application, acquired over a network, such as the Internet, or from any other source. Acquiring the key pair in advance or concurrently with the user action 204 may speed operation.

The application, before, while, or after acquiring the key pair, "asks" the user, for example, by a message display on a screen, whether she wants to configure the application to utilize a biometric sensor of the user device to enable restricted actions without a password, decision 210. If the resulting user input is NO, flow continues via path 212 and the application skips blocks 220, 224 and 230. If the user responds affirmatively (YES) to decision 210, for example, via a user interface, the application submits a first one of the key pair that was acquired at 206, which may be a private key, to the OS for secure storage on the device, block 220. Dashed line 221 represents a logical operation, such as the OS copying the one key of the pair to the storage. In one embodiment, the OS stores the private key in a secure element on the device 102. For example, in some devices, there may be a secure area of memory reserved to the OS and not exposed to applications generally. In other embodiments a trusted platform module (TPM) may be used. There may also be a secure processor configured to manage sensitive information, and having access to its own memory space. In various embodiments, the secure element is not backed up externally, so the private key remains locked on the device (e.g., in the secure device, TPM, or secure processor and memory). More details of these elements are described below with reference to FIG. 6, which illustrates one example of a block diagram of a mobile device 120 (FIG. 1), 600 (FIG. 6), 1002 (FIG. 7).

Referring again to the process 200 of FIG. 2, the application submits the other key of the pair, for example, the public key, to a server (for example, 160 in FIG. 1) for storage, block 224. Dashed line 226 represents a logical operation, such as the public key being copied into a message for transmission to the server. An extant session between the device and the server, for example, an HTTPS session, will serve to authenticate the source of the message, and identify the corresponding user account. This enables the server to store the public key in association with the user account.

In some embodiments, or in the absence of session information, the application may need to identify the customer account for which it is submitting the public key, and at the same time authenticate the source of the submission. This authentication step (not shown) may be done by sending "authentication information" to the server in connection with submission of the public key. The authentication information may pertain to identifying the application, the user, the device, or any combination of the three. For example, a device may be identified by a serial number, radio MAC address, or any other "fingerprint" reasonably unique to the device. Another parameter may include a geographic location of the device, for example, provided by GPS. The server may be configured to reject a submission if the device is currently located too far from a "home location," or located within or near a geographic region "fenced out" by the authentication service as being a security risk. If a new account is being created, in some embodiments, the current location may be stored as the home location for the device. Any combination of the above examples, and/or other parameters may be used as authentication information. Assuming verification at the server side, if needed, the setup phase is successfully completed, block 230, and the user/device can interact securely with the server, via continue block 232. As will be described in more detail with reference to FIG. 3, after the setup phase has successfully been completed, the user's password is no longer needed to access the remote server when using the application executing at block 202. And the user's password need not be stored in the application or otherwise on the device. Instead, the private key has been securely stored on the device.

Once provisioned as described above, the application on device 102 uses the process 300 described below with reference to FIG. 3. But the user can access or perform actions with server 160 using their password when accessing 160 via another device, or using another application on device 102. Thus, 160 may be configured to allow access using both techniques. In some alternative embodiments, the process described above with reference to FIG. 2 may be carried out by the OS, rather than by an application. The same functionality can be implemented in a program or service executed by the OS. It may be implemented, for example, in a system level software library. The OS may conduct these setup procedures in more than one remote server, as long as the remote server is suitably configured. This scenario provides enhanced security but also great convenience for the user, enabling secure interactions with multiple sites with virtually no special action on her part, except for a biometric input as described shortly.

Figure 3:
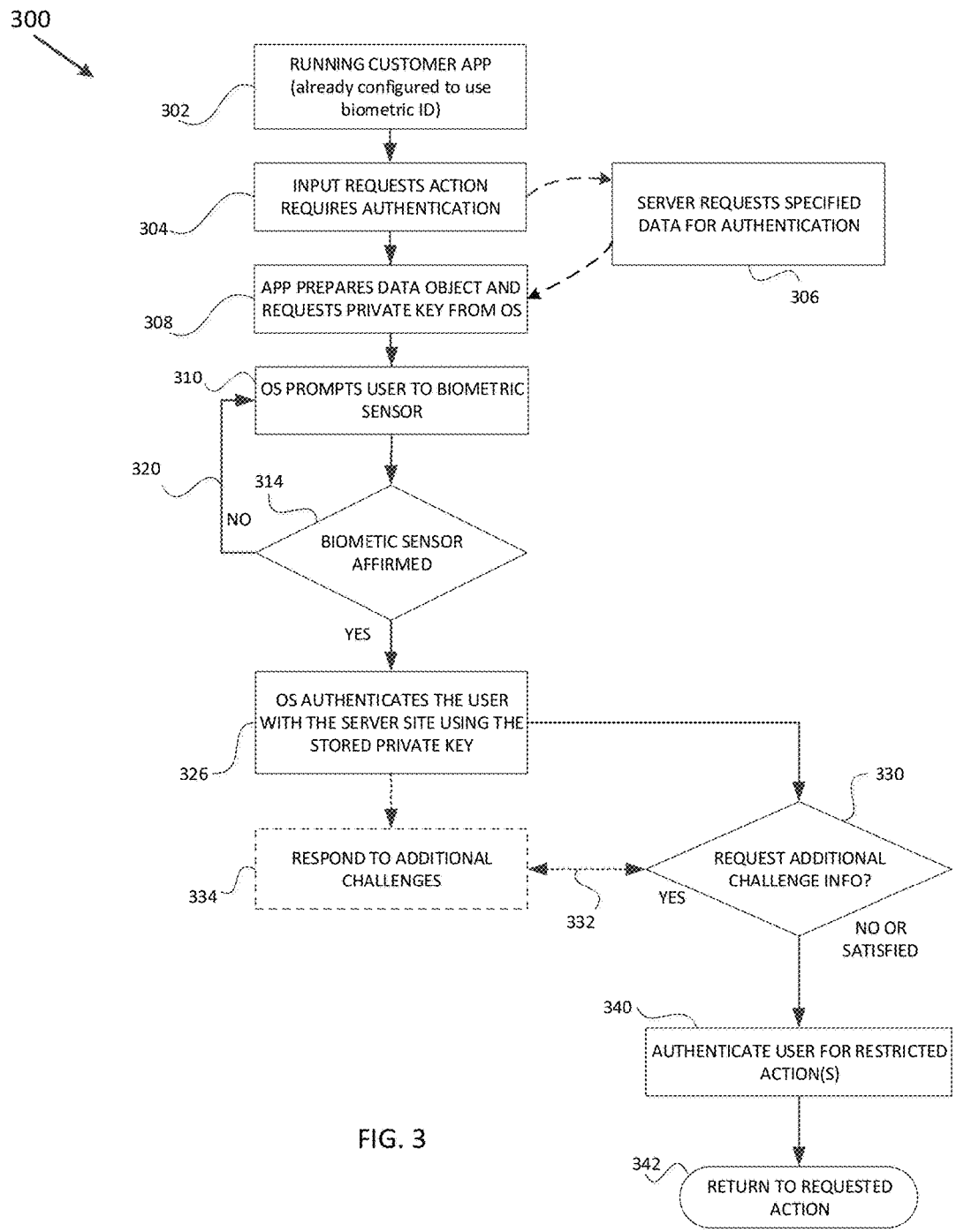
FIG. 3 is a simplified flow diagram illustrating an example process to authenticate a device user to a server, in accordance with various embodiments of the principles described herein.

FIG. 3 is a simplified flow diagram illustrating an example process 300 to authenticate a user or a device, as a prerequisite to permitting an application to take a restricted action with the server side. FIG. 3 assumes that a setup phase has been completed as described above with reference to FIG. 2. At block 302, a customer application is running on a device, and the user or the application requests or attempts a restricted action—one that requires authentication by the server, block 304. As described with above with reference to FIG. 2, various kinds of inputs other than a user action may "request" or initiate a restricted action. At least two different scenarios may be used to define what information the server requires to authenticate the user to permit the restricted action.

In a first scenario, a restricted action authentication protocol has been agreed upon and defined in advance as between the client side application and the server. In other words, the application has been configured, for example, using executable instructions, to generate and provide certain predefined information to the server for authentication. Conversely, the server is configured to receive and process certain information as defined by the authentication protocol as prerequisite to authorizing a restricted action. There may be more than one such protocol; for example, different actions may require different authentication protocols. As one example, access to payment data such as credit card numbers stored on the server may require a more exacting authentication protocol than a simplified purchase action. Here a "simplified purchase action" means one in which as few as one action or input to the server is sufficient to submit an order, namely selecting an item to purchase. Additional data such as payment information and shipping address may be previously stored on the server in association with a user account, and that data may be used to streamline the purchase process. Continuing this scenario, what data the application must send is defined by the applicable authentication protocol—and it may comprise almost any data. To cite a few examples, it may be a nonce type of data such as a timestamp, it may include current GPS data, it may include an identifier of the client device, for example, a MAC address or IP Address, etc. Referring now to box 308, the application will assemble whatever data is required by the protocol into a data object, formatted as required by the protocol, which is to say in a manner that the server is configured to process, and the application requests the private key from the OS.

In a second scenario, the data required by the server for restricted action authentication may be dynamic rather than static. This data may be defined by the server side when needed, i.e., when the user requests an action that requires authentication, box 304. In this embodiment, the server detects the request for a restricted action, and it may send a message to the application on the client side defining what data will be required to authorize the restricted action, box 306. In this case, the data to be required is not known to the application in advance.

The required authentication data in either scenario may comprise almost any data; for example, it may include private user knowledge data. The user may be prompted to input the data via a user input device. In one embodiment, it comprises data that has a one-time use. In other words, it should be designed to resist re-use in a replay attack. For example, nonce data may comprise a random or pseudorandom number; or it may comprise a date-time stamp, or a combination of the two. These are merely examples and not limiting. The authentication data may include information that the user should know or have readily available to them, that they can input via an input device. In some embodiments, a combination of the two scenarios may be used. The server may utilize an authentication protocol agreed upon in advance, and optionally also require further authentication data, thus giving the server side greater flexibility to respond to various conditions. The application may be configured to respond to such a request. Returning to box 308, the application assembles whatever data is required into a data object.

Next or concurrently, the application requests the private key from the OS on the device, also shown in block 308. The OS may then ask for a new biometric input, block 310, to verify the user's identity. In one example, for a device having a touch sensor, the user then touches the sensor, and the associated software generates new biometric data. As noted, any biometric sensor or other ID system may be used. For example, a voice recognition system, or a camera coupled to facial recognition software, or breathalyzer, etc. may serve the same purpose of identifying a human user. All such systems should be considered equivalents of a biometric sensor.

The OS, or in various embodiments, an ID service or subsystem, compares the new biometric data to previously stored data, and if they match, decision 314, the ID of the user is affirmed. If the data does not match, the OS may ask for a re-try and loop via path 320. The number of retries permitted may be limited. In some embodiments, the device may have a secure enclave processor, and the fingerprint sensor may share a factory provisioned key, enabling the secure enclave processor to decrypt data received from the fingerprint sensor. The application processor does not have access to that key or other security parameter (such as a password), and is unable to decrypt data received from the fingerprint sensor. In this manner, the application processor is prevented from accessing decrypted data from the fingerprint sensor, which improves the security of the fingerprint data, making the decrypted fingerprint data inaccessible or less accessible to other programs which are running on the application processor.

If the user ID is confirmed by the biometric input, the OS proceeds to authenticate the user with the server site, box 326. In some embodiments, this authentication of the user with the server may comprise the OS retrieving the private key from memory and providing it to the application. The application in turn uses the private key to encrypt or sign the data object it previously prepared for this purpose. The application then transmits the encrypted or signed data object to the server. At the server side, the server retrieves the public key stored in association with the user account. The server (or a security or encryption service coupled to the server or a proxy server, described later), attempts to decrypt the data object using the public key, and if successful, processes the decrypted data object to confirm it complies with the applicable protocol requirements.

In some embodiments, the server may optionally request additional information, or challenges, decision 330, for example, by sending a message to the application as indicated by dashed line 332. The additional challenge information may comprise any one or more of the three types of information described above (biometric, private user knowledge, and possession of an object or token). For example, the server may ask for a dollar amount of the last purchase, or an author of the last book purchased, or a manufacturer and serial number of the device hosting the application, etc. In some embodiments, the type of additional challenge information that may be required to complete authentication may be based on changes in the information already received. For example, if there has been a change in the application version, an additional piece of data may be requested. Updating an application to a newer version is commonplace and not necessarily suspicious, but still it may be good policy to require some further authentication data when there is a change. This additional information can further increase the probability that the user/device seeking authentication in fact are who or what they claim to be. The application assembles the requested challenge information, via various interfaces as needed, block 334, and communicates them in a reply to the server. Assuming the challenges, if any, are satisfied, the user/device is authenticated, block 340, and the process returns to proceed with the requested restricted action, terminus 342.

One advantage of the processes described with reference to FIGS. 2-3 is that the application, after provisioning, no longer needs to store or handle the user's password. This arrangement has several potential advantages. If the device is compromised (lost, stolen, accessed without permission, etc.) and secret information is disclosed, for example, the private key, this is a device-specific secret and does not affect the user's password. The key can be revoked or replaced (a new key pair generated) without changing the customer's password. Responsive to detecting that the device has dissociated from the user account, the stored key can be dissociated from the user account. Further, a new key pair can be deployed. It may be deployed from the client side application, as described with reference to FIG. 2, or it may utilize a new encryption key pair provided by the server. The new key pair may be provisioned without changing an existing user credential, and without affecting access to the first user account on the server from a different device based on the existing user credential.

Further, the server can be configured to detect which devices are used to authenticate the customer (utilizing setup phase authentication data). This aspect can be useful in detecting and resisting fraud. In some embodiments, the server side or authentication service (end-point) may be configured to permit authentication only through a device "secret" such as the private key. This aspect can be used to improve managing risk scoring and more easily avoid the need for additional authentication claims, such as CAPTCHA or a multi-factor authentication ("MFA"). In general, MFA requires at least two of the following kinds of factors: knowledge (something the user knows, like a password); possession (something they have, like entering a code they see on an OTP token (one-time password token), and inherence (something they are—e.g., biometrics). By avoiding MFA, a user of the embodiments of the present disclosure enjoys robust security while obviating the need for remembering passwords, carrying OTP tokens or other devices, etc. In terms of implementation, in some embodiments, the present methods can be configured in an application without any modifications to the underlying OS on the device. In other embodiments, the present methods may be implemented for execution by the OS, potentially extending this service to multiple different apps on the device.

Figure 4A:
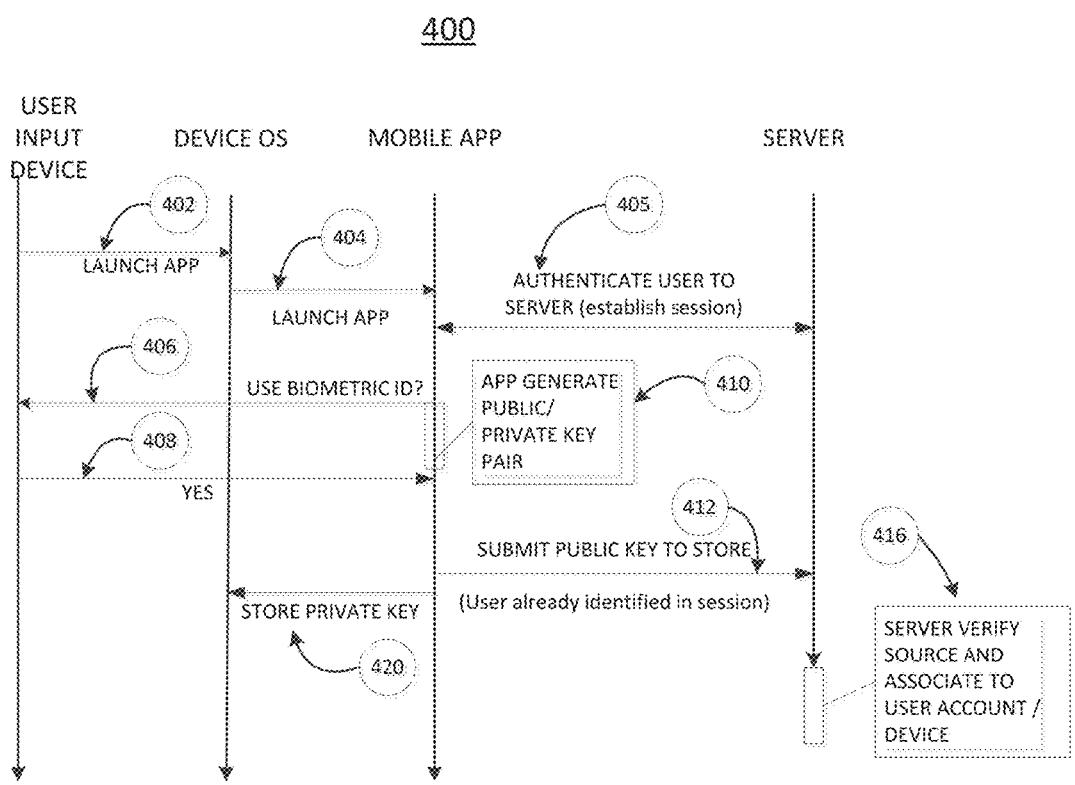
FIG. 4A is a simplified communication diagram illustrating an example of communications among a user input device, a device OS, a mobile application executing on the device, and a remote server system to provision the device for subsequent secure transactions, in accordance with various embodiments of the principles described herein.
Figure 4B:
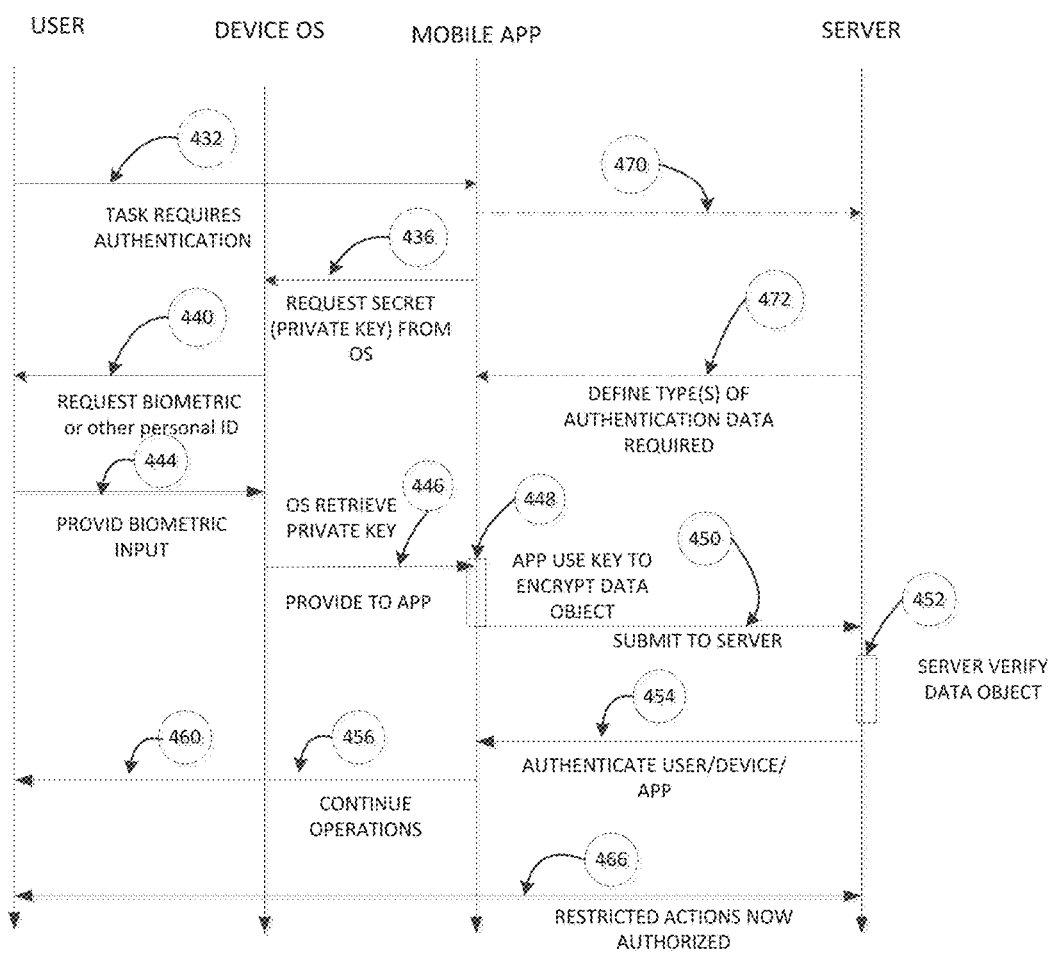
FIG. 4B a simplified communication diagram illustrating an example of communications among a user input device, a device OS, a mobile application executing on the device, and a remote server system to authenticate the user/device to permit restricted actions, in accordance with various embodiments of the principles described herein.

FIG. 4A shows a simplified communication diagram 400 illustrating an example of communications among a user input device, a device OS, a mobile application executing on the device, and a remote server system, to setup or initialize the device for subsequent secure transactions, in accordance with various embodiments of the principles described herein. Although a mobile application is identified in FIGS. 4A-4B, it is merely an example of an application; there is no requirement that it be a mobile application. Similarly, there is no requirement that the device on which the OS is executing be mobile. Time is represented as a vertical dimension running from top to bottom of the diagram, although the drawing is not intended to be drawn to any scale or portioned to any particular variables. The term "message" as used with regard to FIGS. 4A-4B is intended to be broadly construed; it refers to any means to send data from one entity or object to another. It may comprise a formal message or data packet, with header, payload, etc., or simply an "indication" such as a few bytes that indicate a key press or mouse click. On a device, messages may pass between elements internally, for example, over an integrated signal bus, wire(s) or a cable. As between the customer interface, device OS and mobile application, these messages may be as simple as a single byte or even an asynchronous pulse on a wire. Messaging to and from the server (412, 450, and 454) more commonly will occur over a network. The network may be wired, wireless, or a hybrid. Network messages are likely to be more formal, and may comply with standard network protocols, of which there are many examples, including WIFI/IMAX protocols, Bluetooth protocol, Fiber Channel, TCP/IP, telnet, HTTPS, SSL, and many others.

Referring again to FIG. 4A, a user inputs a message 402 to the device OS to launch an application. This message 402 may be initiated through any user interface coupled to the OS such as a physical input device (mouse, touchscreen), microphone, etc. described further with reference to FIG. 6. Responsive to the message 402, the OS launches the application via message 404. The mobile application begins operation, and initiates a session with the server, for example, using HTTPS protocols, messaging 405. After a session is established, the application may prompt the user as to whether she wants to use a biometric sensor, for example, a touch sensor, for identification in connection with operation of the application. The term "prompt" here is intended broadly to include an audible message, a screen display message, etc. arranged to solicit a reply from the user. The application may "prompt" the user by sending a suitable message 406 to a user interface.

If the user responds in the affirmative, again indicating her response using any suitable interface to the OS, illustrated by a message 408, the OS passes the message on to the application. Responsive to receiving an affirmative response (YES), indicating the user's intent to utilize the biometric sensor, the application generates or acquires a cryptographic encryption key pair, indicated at 410. As discussed above, the key pair, in one embodiment, is an asymmetric key pair, comprising a private key and a corresponding public key. The mobile application may submit the public key for storage on the server, message 412, utilizing authentication and security measures discussed above. The server stores the public key, box 416, in association with the corresponding user account. The application further sends the other key of the pair, in one embodiment the private key, to the OS via a message 420. The OS is configured to store the private key in a secure element as described earlier.

FIG. 4B presents a simplified communication diagram 430 illustrating an example of communications among a user, a device OS, a mobile application executing on the device, and a remote server system during a "use phase," which assumes that the setup phase described above with reference to FIG. 4A has been completed. This process is to authenticate the user/device, and on that basis permit it to conduct restricted actions on the server. A device OS may receive a message 432 from a user via a user interface, to initiate a task or action that requires authentication; i.e., a restricted action. The OS passes the message on to the mobile application. In some embodiments, the same message 432 is not literally passed through to the application; rather the OS may generate and send a separate message to the same effect.

In response to message 432, the mobile application requests a private key from the OS, via message 436. In turn, the OS requests a biometric input, in this example a touch input, from the user, via message 440, again utilizing any user interface to communicate to the user. For example, a screen display message, audio output, etc. may be used. A light on a biometric sensor, as another example, may be activated to signal the user to utilize the sensor to input biometric data. Responsive to the OS request 440, a user may provide a biometric input such as by touching a sensor, placing her face in view of a camera, providing a blood, saliva or other fluid sample, etc. This feature may be implemented using any biometric sensor now known or later invented, all of which should be considered equivalent to the examples mentioned. A touch ID is shown in FIG. 4B for illustration and not limitation. The touch ID input is identified as message 444 to the OS. In some embodiments, a biometric sensor may input raw sensor data to a process to form the ID data. For example, raw image data from a CCD sensor may be processed in various ways to support facial recognition.

As mentioned above, the OS may verify the acquired biometric data; that is, verify the identity of the user, by comparing the new data to previously acquired and stored biometric data to determine whether or not they match. In some embodiments, the biometric data is stored in a secure element or area of memory. In one embodiment, the biometric data is not exposed to any application directly. Rather, as illustrated here, it may be used by the OS when requested by the application. The OS may return a simple yes/no result from the biometric comparison. In the present illustration, assuming a match, the OS retrieves the private key from memory, and sends it via message 446 to the mobile application that requested it.

Continuing downward in the FIG. 4B, in other words moving forward in time, next the mobile application assembles the required authentication data into a data object, and uses the private key to sign or encrypt the object, box 448. Next the application sends the encrypted data object to the server via message 450. In some embodiments, the server may have defined what data it requires for authentication. In some embodiments, there may be a default type of authentication data configured on the server. To be clear, the type of authentication data, for example, a date-time stamp, may be predefined, but the actual data may be frequently updated as in the case of a nonce. In some embodiments, the server may identify a type of data required for authentication "on the fly" in response to a pending restricted action. To illustrate, a message shown as dashed line 470 may be sent to the server by the application when a restricted action is first requested. The server may then return a message 472 specifying what type of authentication data it will require. For example, the server may be configured to randomly select among several types of potential authentication data, or at least choose a different set for each authentication exchange.

Referring again to message 450, the server receives the required authentication data, encrypted using the private key, and it then attempts to decrypt the data or verify the signature, box 452, using the public key previously stored on the server in association with the user, device, and/or application as discussed above. If the decryption succeeds, the server can then process the now exposed (decrypted) authentication data to verify that it matches the data expected. The authentication data required by the server may include, for example, one or more identifiers of the user, the device, the application, or any combination of those parameters. In this way, multiple levels of security are enforced, with minimal effort by the user, and no password is needed to access restricted actions or services on the server. If the data is successfully verified, the user is then authorized to proceed with the requested action, and the application may be notified by a message 454. The application may then continue to process the task that required authentication, initially via message 456 to the OS, which in turn sends a corresponding message 460 to the user. The restricted actions then proceed via messages generally indicated at 466 between the user, OS, application and server.

Figure 5:
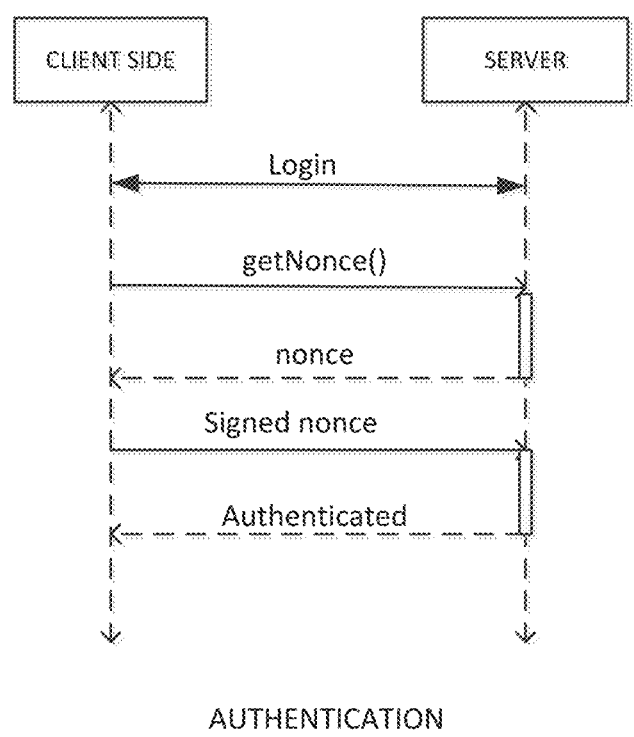
FIG. 5 is a simplified communication diagram illustrating an example of interactions with a server for secure authentication.

FIG. 5 illustrates another variation in terms of authentication to the server to enable restricted actions. This communication diagram 500 is simplified, and shows the "client side" only generally. In some embodiments, the client side may comprise user interfaces, OS, and application software, all operatively coupled to a device. The client side communicates with the server typically over a network (not shown). In the figure, from the top down, the client side logs into the server and commences a user session. The client side sends a message or a call to request a nonce definition from the server; and the server sends a reply with the required nonce definition. The client side then assembles the requested data, signs (encrypts) the nonce data, and sends it to the server. If the server succeeds in decryption and verification of the nonce data, as discussed above, the client side is authenticated. This exchange is not limited to permission to execute restricted actions on the server. In some embodiments, after this authentication has succeeded, restricted actions may be permitted without further authentication during the same session. This exchange may take place as part of a login process.

Figure 6:
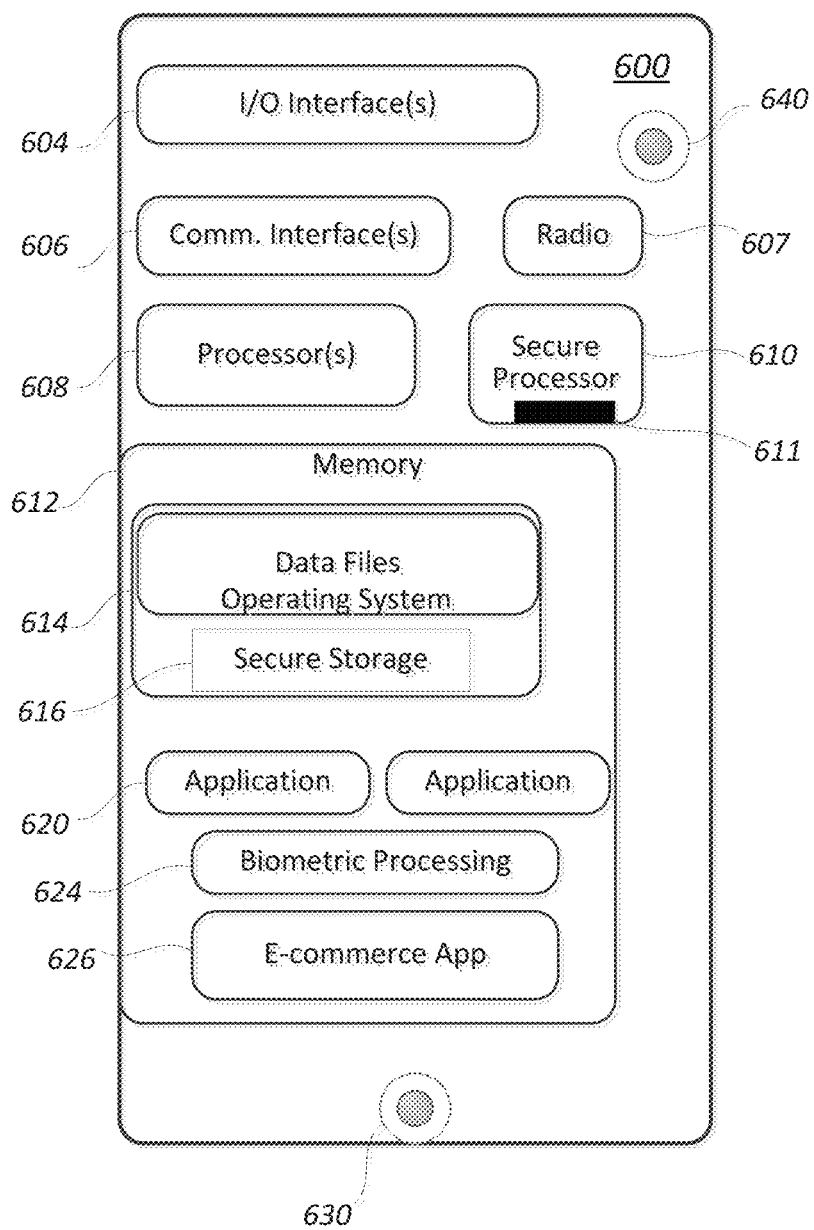
FIG. 6 is a simplified block diagram of selected elements of a mobile computing device that may be used in connection with principles described herein.
Figure 7:
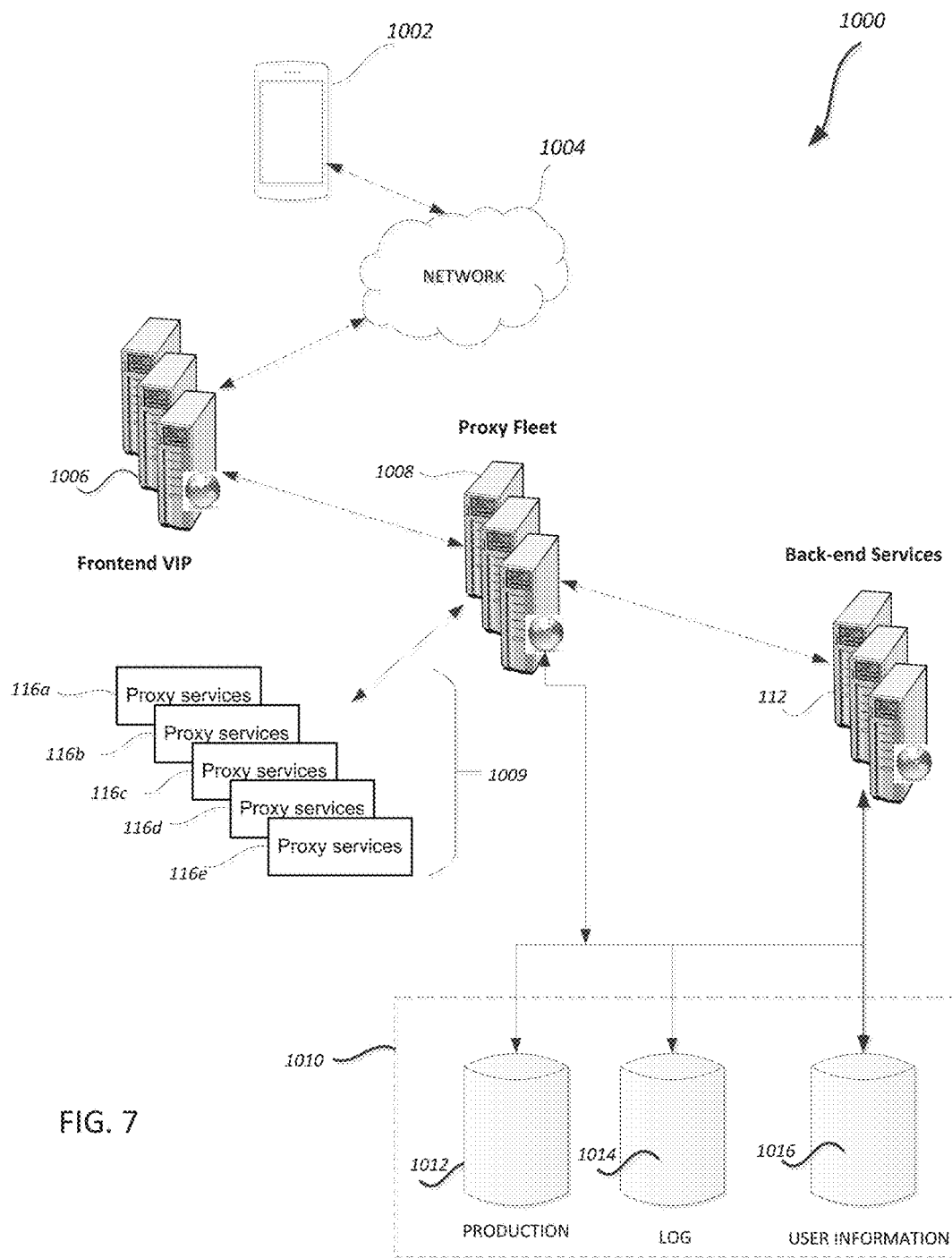
FIG. 7 is a simplified overall diagram of a system environment that may be used in accordance with various embodiments of the principles described herein.

FIG. 6 is a simplified block diagram of selected elements of a mobile computing device 600 that may be used in connection with principles described herein. This simplified figure omits some elements such as a keyboard, display screen, microphone, speakers, battery, etc. Rather, the focus is on selected internal elements. The device 600 includes I/O interfaces 604. I/O interfaces may include, for example, a keyboard, display screen, speaker, etc. Some of these may implement human user interfaces, while others may interface to other devices. Communication interfaces 606 may include, in some embodiments, wired or wireless adapters. A wireless interface (not shown) may implement Wi-Fi or a short-range wireless interface such as Bluetooth® or NFC. In each case the interface may implement a corresponding communication protocol. A wireless interface may utilize a radio 607, for example, to communicate over a wireless telecom network. Another communication interface may implement a wired protocol such as Ethernet or USB. Any or all of these may be used for communications over a network such as network 150 in FIG. 1 or network 1004 in FIG. 7. Other network adapters, technologies, and/or protocols, now known or later developed, should be considered equivalents of those mentioned and may be utilized in embodiments consistent with this disclosure.

The example device 600 may include one or more processors 608 such as a microprocessor. The microprocessor may have on-board or integrated memory (not shown), or an interface to device memory 612, or both. It may utilize cache memory. An OS 614 may be stored in system memory 612 and configured for execution on the processor(s) 608. The OS in general will interface with the various I/O interfaces 604 and communication interfaces 606. The OS may have its own secure storage element 616 which is not exposed directly to any application program stored on the device, for example, application 620. The secure storage 616 may be excluded from external backup of the device for better security. A secure enclave processor 610 may be provisioned to carry out security processes, such as managing passwords or biometric data. The OS may be configured to carry out some or all of the operations described above with reference to an OS of a device.

Various application programs or "apps" 620 maybe stored in memory 612 for execution on the OS 614 of the device 600. Details of installing and running various apps are known. An e-commerce application 626 may be installed and used to provide the functionalities discussed above in the preceding figures where an "application" is discussed, although the apps described above are not limited to e-commerce.

A biometric sensor 630 may be installed on the device 600 to acquire biometric data of a user. The sensor 630 may be, for example, a touch sensitive sensor, or any other type of sensor, including but not limited to those mentioned above. The sensor 630 may be coupled to a biometric processing application or service 624 for processing biometric data. The application 624 may compare acquired biometric data to previously stored data to authenticate a user. In other embodiments, the OS may conduct the comparison. The OS may provide results of the biometric data comparison to an application, for example, application 626 that requested it. The device may include a second biometric sensor 640 of a type different from the sensor 630. In one example, the sensor 640 may be a camera or optical sensor, which may be coupled to a facial recognition application or service (not shown) for authenticating or identifying a user.

Encryption processes may be carried out by the OS. The encryption processes may be conducted using the processor 608 or a secure enclave processor 610. The secure enclave processor 610 may have its own exclusive, secure, memory element 611 where it may store data for encryption, encrypted data, and/or a key to be used for encryption or decryption. In some embodiments, as mentioned, the fingerprint sensor 630 or biometric processing software 634 may share a factory provisioned key, enabling the secure enclave processor to decrypt data received from the fingerprint sensor. The application processor 608 does not have access to that factory provisioned key or other security parameter (such as a password). For example, during an authentication exchange with a remote server, a user application 626 may communicate with the server and determine what data is required by the server for authentication of the device. The application 626 may assemble that data, acquiring some or all of it from the OS. The application may then request that the OS 614 encrypt the authentication data. In some embodiments, the OS or the secure processor 611 may read an encryption key from memory and provide the key to the application to conduct the encryption. The key may be stored in the secure enclave processor memory 611. In other examples, the key may be stored in a secure storage element 616 associated with the OS. The application may then send a message to the server containing encrypted authentication data. The message may be sent utilizing the OS which in turn utilizes lower levels elements such as a network adapter or other communication interfaces 606, details of which are known. In one embodiment, encryption is done by the secure processor 610, with the key stored in the secure element 611, and encrypted data returned to the requesting application.

FIG. 7 is a simplified overall diagram of a system that may be used in accordance with various embodiments of the principles described herein. An example of an environment 1000 in which embodiments of this disclosure may be used is illustrated. A client-side device 1002 as described above has access to a network 1004. The client-side device 1002 may correspond to client device 102 in FIG. 1. A frontend VIP (virtual IP address system) 1006 is coupled to the network 1004. A virtual IP address (VIP) is an IP address that doesn't correspond to an actual physical network interface (port). Uses for VIPs include Network Address Translation (especially, One-to-many NAT), fault-tolerance, and some kinds of security. A proxy fleet 1008 comprises one or more servers configured to implement a set of services that proxy requests from the frontend VIP 1006 to back-end services, for example, a web site, and various web applications, which may be implemented on one or more backend servers 112. The backend servers 112 and the proxy fleet 1008 have access to a datastore 1010 further described below.

Proxy fleet 1008 performs a variety of functions, some of which are to protect services. Examples of proxy services 1009, indicated individually as 116a-116e, may include insulating back-end web applications from slow clients, redirecting legacy URLs (to preserve SEO during platform migration), mapping external URLs to internal URLs, correcting mistyped domain names, redirecting short URLs, high-volume traffic analysis and load shedding, and security, authentication and encryption services. For example, a proxy service may be configured to authenticate a user, device, and/or application, for example, at the client device 1002, responsive to communication over the network 1004. After authentication, a proxy service may identify a corresponding customer account, and then store a public key submitted to the proxy server in association with the customer account (or account identifier) in the datastore 1010.

One primary purpose of proxy fleet 1008 may be to consolidate much of the website request routing functionality in a centralized location of the website request pipeline. As such, the system is highly available, fault-tolerant, scalable and easy to manage. In use, a customer may actually utilize multiple different proxy servers 1008 and multiple different proxy services 1009 over the course of their "session". For example, an initial request may go to service 116a and a subsequent request may go to 116b although these actions may not be apparent to the client.

Referring again to FIG. 7, as will be appreciated, although a web-based environment is used for purposes of explanation, different environments may be used, as appropriate, to implement various embodiments. The electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network 1004 can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof.

The illustrative environment includes at least one proxy server, a backend server, and a data store 1010. It should be understood that there can be several application servers, layers or other elements, processes or components, which may be chained or otherwise configured, which can interact to perform tasks such as obtaining data from an appropriate data store. Servers, as used herein, including the VIP, proxy fleet, and back-end services servers, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The backend services server 112 may include any appropriate hardware, software and firmware for integrating with the data store as needed to execute aspects of one or more applications, handling some or all of the data access and business logic for some applications and or back-end services. The backend services server 112 may provide access control services in cooperation with the data store and is able to generate content including, but not limited to, text, graphics, audio, video and/or other content usable to be provided to the user, which may be served to the user by the proxy fleet in the form of HyperText Markup Language ("HTML"), Extensible Markup Language ("XML"), JavaScript, Cascading Style Sheets ("CSS") or another appropriate client-side structured language. The proxy fleet 1008 may implement some or all of the functionality of the proxy server 116 of FIG. 1. A proxy service 116c, in some embodiments, may implement the functionality of the protective script service 134 of FIG. 1, including without limitation the creation and management of protective scripts. The handling of all requests and responses, as well as the delivery of content between the client device 1002 and the backend services 112, may be handled by the frontend VIP in conjunction with the proxy fleet 1008 using, for example, PHP: Hypertext Preprocessor ("PHP"), Python, Ruby, Perl, Java, HTML, XML or another appropriate server-side structured language in this example. It should be understood that the various servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 may include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The datastore 1010 may implement the datastore 170 of FIG. 1, including storage of customer account numbers, corresponding identifiers, and encryption keys. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a webpage that the user is able to view via a browser on the user device 1002. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 1000 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

The invention claimed is:

1. A computer system, comprising:
a network interface configured to transmit data over a network;
a biometric sensor configured to acquire biometric data of a user;
a secure storage element configured to store data including the biometric data acquired by the biometric sensor;
an input device;
one or more hardware processors operatively coupled to the network interface, the biometric sensor, the secure storage element, and the input device; and
memory operatively coupled to the one or more hardware processors, the memory storing an operating system and an application program that includes instructions executable by the one or more hardware processors that, as a result of execution by the one or more hardware processors, cause the one or more hardware processors to:
establish a secure session between the computer system and a server using a user credential;
responsive to receiving a selection via the input device for authentication using the biometric data, configure the application program for authentication using the biometric data, and generate an asymmetric cryptographic key pair;
store a first key of the cryptographic key pair in the secure storage element via the operating system, without storing the user credential in the secure storage element, wherein access to the first key is secured by the biometric data;
transmit a second key of the cryptographic key pair to the server via the network for storage in association with a user account associated with the user;
responsive to receiving a request to perform an action that requires the application program to authenticate an identity of the user of the computing system with the server, activate a presentation device associated with the computer system so as to prompt the user to input new biometric data using the biometric sensor;
responsive to the operating system authenticating the identity of the user using the new biometric data, retrieve the first key via the operating system from the secure storage element;
encrypt an authentication data object using the first key to form an encrypted data object;
transmit the encrypted data object to the server to enable the server to authorize the action that required authentication in lieu of the user credential, based on decrypting the encrypted data object using the stored second key; and
as a result of authorization by the server responsive to the decrypting of the encrypted data object using the stored second key, proceed to conduct the action requested.

2. The computer system of claim 1, further comprising:
a server having a network interface configured to transmit and receive data over a network, the server further having one or more server processors operatively coupled to the network interface, and having a memory storing instructions executable by the one or more server processors that, as a result of execution by the one or more server processors, cause the one or more server processors to:
receive a first message via the network, the first message including a second key of an asymmetric cryptographic key pair;
identify a user associated with the first message, and store the second key in association with a user account associated with the identified user;

receive a second message via the network, the second message including an encrypted data object submitted for authorization to conduct a restricted action on the server;

identify a user account associated with the second message;

access the second key;

utilize the second key to decrypt the encrypted data object;

verify the decrypted data object; and responsive to verification of the decrypted data object, authorize the restricted action without receiving a user credential in connection with the request.

3. The computer system of claim 2 wherein:

the one or more server processors are further configured to:

responsive to the second message, before authorizing the requested action, transmit a challenge request to the computer system via the network, the challenge request specifying challenge information;

receive a response to the challenge request including the specified challenge information;

validate the received challenge information; and responsive to validation of the received challenge information, authorize the requested action.

4. A computer-implemented method, comprising:

authenticating an identity of a user, and storing user personal authentication data;

obtaining an asymmetric encryption key pair;

storing a first key of the key pair in a secure storage element of a device by way of an operating system of the device, wherein access to the first key is secured by the user personal authentication data stored on the device, and wherein the user personal authentication data is required to access the first key, wherein the user personal authentication data comprises data of at least one of biometric data, private user knowledge data, or possession of an object;

sending a second key of the pair to a remote server for storage in association with a user account, wherein the first key is a designated as a private key and the second key is designated as a public key;

responsive to receiving a request that requires authentication with the remote server to permit a restricted action, request input of the user personal authentication data, and verify the identity of the user based on the input user personal authentication data;

as a result of verification of the user identity, access the stored first key and utilize the first key to generate a cryptographically verifiable object, wherein the cryptographically verifiable object is generated by encrypting a nonce using the first key so as to be decryptable by the remote server using the second key, where decrypting the cryptographically verifiable object using the second key serves as cryptographic verification of the cryptographically verifiable object; and sending the cryptographically verifiable object to the remote server to enable the server to authorize the restricted action without the user personal authentication data or a user credential.

5. The method of claim 4 wherein the restricted action includes a purchase transaction.

6. The method of claim 4 further comprising:

responsive to detecting that the device has dissociated from the user account, dissociating the stored first key from the user account; and resetting the first key stored in the remote server to a new key value received from the device, wherein the new key value is complementary to a new complementary key value securely stored on the device, while maintaining an existing user credential, and allowing access to the user account on the server from a different device based on the existing user credential.

7. The method of claim 6 wherein the object includes components to enable communication with the device comprising at least one of (a) near field communication, (b) short-range wireless communication, (c) WiFi connection, (d) wireless telecom network communication, (e) radio frequency communication, or (f) a physical cable connection to the device.

8. The method of claim 6 wherein the user personal authentication data comprises the biometric data acquired by at least one of a capacitive sensor, retinal scanner, infrared imaging sensor, microphone for voice recognition, or an optical sensor for facial recognition.

9. The method of claim 6 wherein sending a second key of the pair to the remote server includes authenticating to the remote server a source of the second key as one associated with an account on the remote server.

10. The method of claim 9 wherein authenticating the source of the second key includes sending authentication data unique to the user account, and encrypting the authentication data unique to the user account using the first key.

11. A method in a server system, comprising:

receiving a request from a device to conduct a restricted action on the server system, the request including a cryptographically verifiable authentication data object, wherein the cryptographically verifiable authentication data object includes authentication data compliant with a predefined authentication protocol established between the device and the server system, wherein the cryptographically verifiable authentication data object is encrypted according to the device-specific first key stored in the device other than the server for use in authentication to the server in lieu of a user credential, wherein access to the device specific first key is secured by biometric data associated with a user account;

identifying the user account associated with the request;

using a second key previously stored on the server system in association with the identified user account, verifying authenticity of the data object by programmatically interrogating the data object, wherein the first and second keys form an asymmetric cryptographic key pair; and responsive to the authenticity being verified, authorizing the restricted action to be taken in the server system.

12. The method of claim 11 wherein:

the server system comprising an e-commerce server system, and the restricted action includes a purchase transaction.

13. The method of claim 11 wherein: the first key is a designated as a private key and the second key is designated as a public key.

14. The method of claim 11 wherein:

the cryptographically verifiable data object includes nonce data; and wherein verifying authenticity of the data object includes analyzing the nonce data.

15. The method of claim 11 wherein:

the cryptographically verifiable data object comprises authentication data unique to the user account, and verifying authenticity of the data object includes comparing the authentication data to stored data associated with the user account.

16. The method of claim 15 wherein:
the authentication data unique to the user account comprises the biometric data unique to the device.

17. The method of claim 11, further comprising:
responsive to detecting that the device has dissociated from the user account, dissociating the stored first key from the user account; and
resetting the first key stored in the server to a new key value received from the device, wherein the new key value is complementary to a new complementary key value securely stored on the device, while maintaining an existing user credential, and allowing access to the user account on the server from a different device based on the existing user credential.

18. The method of claim 11 and further comprising:
responsive to the authenticity being verified using the second key, sending a challenge message to the device to request additional challenge data associated with the user account before authorizing the selected actions;
receiving a response to the challenge message including the requested challenge data;
verifying the requested challenge data; and then
responsive to verification of the requested challenge data, authorizing the selected actions.

19. The method of claim 11 wherein:
the request is received at a server system comprising an e-commerce server system, and the restricted action includes a purchase transaction.

20. The computer system of claim 1, wherein the user credential comprises at least a user identification and a password.

* * * * *